US012812456B2

(12) United States Patent
Liu et al.

(10) Patent No.: US 12,812,456 B2
(45) Date of Patent: Nov. 24, 2026

(54) INTER-ENCODER SIGNALING FOR NETWORK ENCODER SELECTION

(71) Applicant: QUALCOMM Incorporated, San Diego, CA (US)

(72) Inventors: Guangyi Liu, San Diego, CA (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/448,685

(22) Filed: Sep. 23, 2021

(65) Prior Publication Data

US 2023/0092915 A1 Mar. 23, 2023

(51) Int. Cl.
*H04W 28/02* (2009.01)
*H04L 5/00* (2006.01)

(52) U.S. Cl.
CPC ....... *H04W 28/0273* (2013.01); *H04L 5/0016* (2013.01); *H04W 28/0205* (2013.01); *H04W 28/0226* (2013.01)

(58) Field of Classification Search
CPC ......... H04W 28/0273; H04W 28/0205; H04W 28/0226; H04L 5/0016
See application file for complete search history.

(56) References Cited

U.S. PATENT DOCUMENTS 7,006,472 B1 * 2/2006 Immonen ............ H04L 47/2408 370/332
10,602,550 B2 * 3/2020 Burbidge .............. H04W 76/10
11,438,736 B2 * 9/2022 Fehrenbach ............ H04W 4/08
12,063,591 B2 * 8/2024 Chang ..................... H04B 7/155
2002/0024935 A1 * 2/2002 Furukawa .............. H04B 7/155 370/349
2008/0089275 A1 * 4/2008 Hart ....................... H04L 1/0072 370/328
2008/0137585 A1 * 6/2008 Loyola ....................... H04L 1/06 370/315
2009/0147689 A1 * 6/2009 Kao ......................... H04L 43/10 370/243
2010/0067459 A1 * 3/2010 Goransson ............ H04L 1/1812 375/267
2010/0088568 A1 * 4/2010 Larsson ................ H04L 1/1819 714/751
2011/0026429 A1 * 2/2011 Ben Slimane ........ H04L 1/0026 370/252
2012/0044828 A1 * 2/2012 Seo ......................... H04L 47/83 370/252

(Continued)

FOREIGN PATENT DOCUMENTS

WO WO-2010083901 A1 * 7/2010 ......... H04B 7/15521
WO WO-2018231400 A1 * 12/2018 ............... H04L 1/08

*Primary Examiner* — Mehmood B. Khan

(74) *Attorney, Agent, or Firm* — Harrity & Harrity, LLP

(57) ABSTRACT

Various aspects of the present disclosure generally relate to wireless communication. In some aspects, a first network node may receive, from a user equipment (UE), an indication to perform network coding for a communication. The first network node may selectively transmit, based at least in part on determining whether the network coding is to be performed by the first network node or a second network node, the communication using network coding. Numerous other aspects are described.

30 Claims, 10 Drawing Sheets

(56) References Cited

U.S. PATENT DOCUMENTS

| | | | | |
|---|---|---|---|---|
| 2014/0171062 | A1* | 6/2014 | Fallgren | H04W 40/22<br>455/422.1 |
| 2016/0021012 | A1* | 1/2016 | Uchida | H04L 41/0806<br>370/235 |
| 2016/0049962 | A1* | 2/2016 | Li | H03M 13/611<br>714/776 |
| 2016/0255668 | A1* | 9/2016 | Wei | H04W 8/005<br>455/434 |
| 2016/0277886 | A1* | 9/2016 | Quatrini | G01C 21/20 |
| 2020/0044973 | A1* | 2/2020 | Hei | H04L 43/0882 |
| 2020/0359360 | A1* | 11/2020 | Reimann | H04W 72/04 |
| 2022/0021491 | A1* | 1/2022 | Zhou | H04L 1/0026 |
| 2022/0039082 | A1* | 2/2022 | Belleschi | H04W 4/021 |
| 2022/0046527 | A1* | 2/2022 | Chang | H04B 7/155 |
| 2022/0078825 | A1* | 3/2022 | Davydov | H04B 7/0639 |
| 2022/0191725 | A1* | 6/2022 | Ashraf | H04L 1/1825 |
| 2022/0225290 | A1* | 7/2022 | Ganesan | H04W 24/10 |
| 2022/0248375 | A1* | 8/2022 | Baek | H04W 28/0236 |
| 2022/0338204 | A1* | 10/2022 | Jung | H04W 92/18 |
| 2022/0353799 | A1* | 11/2022 | Talebi Fard | H04W 76/10 |
| 2023/0047127 | A1* | 2/2023 | Cloud | H04L 67/565 |
| 2023/0130805 | A1* | 4/2023 | Abotabl | H03F 3/245<br>375/262 |
| 2023/0283413 | A1* | 9/2023 | Basu | H04L 1/1819<br>370/389 |

* cited by examiner

INTER-ENCODER SIGNALING FOR NETWORK ENCODER SELECTION

FIELD OF THE DISCLOSURE

Aspects of the present disclosure generally relate to wireless communication and to techniques and apparatuses for inter-encoder signaling for network encoder selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node. The method may include receiving, from a user equipment (UE), an indication to perform network coding for a communication. The method may include selectively transmitting, based at least in part on determining whether the network coding is to be performed by the first network node or a second network node, the communication using network coding.

Some aspects described herein relate to an apparatus for wireless communication performed by a first network node. The apparatus may include a memory and one or more processors, coupled to the memory. The one or more processors may be configured to receive, from a UE, an indication to perform network coding for a communication. The one or more processors may be configured to selectively transmit, based at least in part on determining whether the network coding is to be performed by the first network node or a second network node, the communication using network coding.

Some aspects described herein relate to a non-transitory computer-readable medium that stores a set of instructions for wireless communication by a first network node. The set of instructions, when executed by one or more processors of the first network node, may cause the first network node to receive, from a UE, an indication to perform network coding for a communication. The set of instructions, when executed by one or more processors of the first network node, may cause the first network node to selectively transmit, based at least in part on determining whether the network coding is to be performed by the first network node or a second network node, the communication using network coding.

Some aspects described herein relate to an apparatus for wireless communication. The apparatus may include means for receiving, from a UE, an indication to perform network coding for a communication. The apparatus may include means for selectively transmitting, based at least in part on determining whether the network coding is to be performed by the apparatus or a second apparatus, the communication using network coding.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
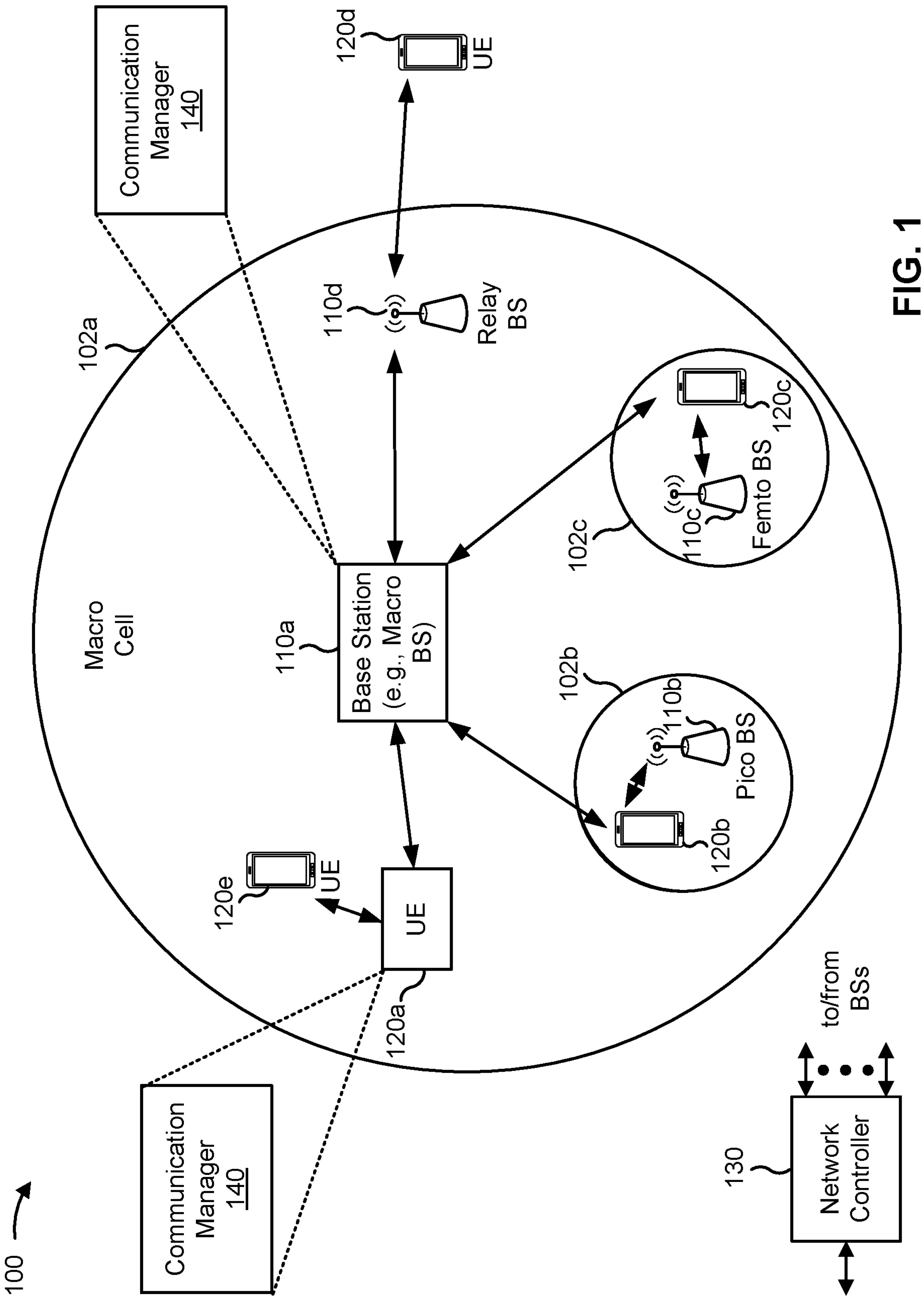
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), one or more network nodes, and/or other network entities. A network node may be a UE (e.g., a roadside unit or a vehicle), such as the UE 120, or may be a base station, such as the base station 110. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a road-side unit, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the UE 120 or the BS 110) may include a communication manager 140. As described in more detail elsewhere herein, the communication manager 140 may receive, from a UE, an indication to perform network coding for a communication; and selectively transmit, based at least in part on determining whether the network coding is to be performed by the first network node or a second network node, the communication using network coding. Additionally, or alternatively, the communication manager 140 may perform one or more other operations described herein.

As indicated above, FIG. 1 is provided as an example. Other examples may differ from what is described with regard to FIG. 1.

Figure 2:
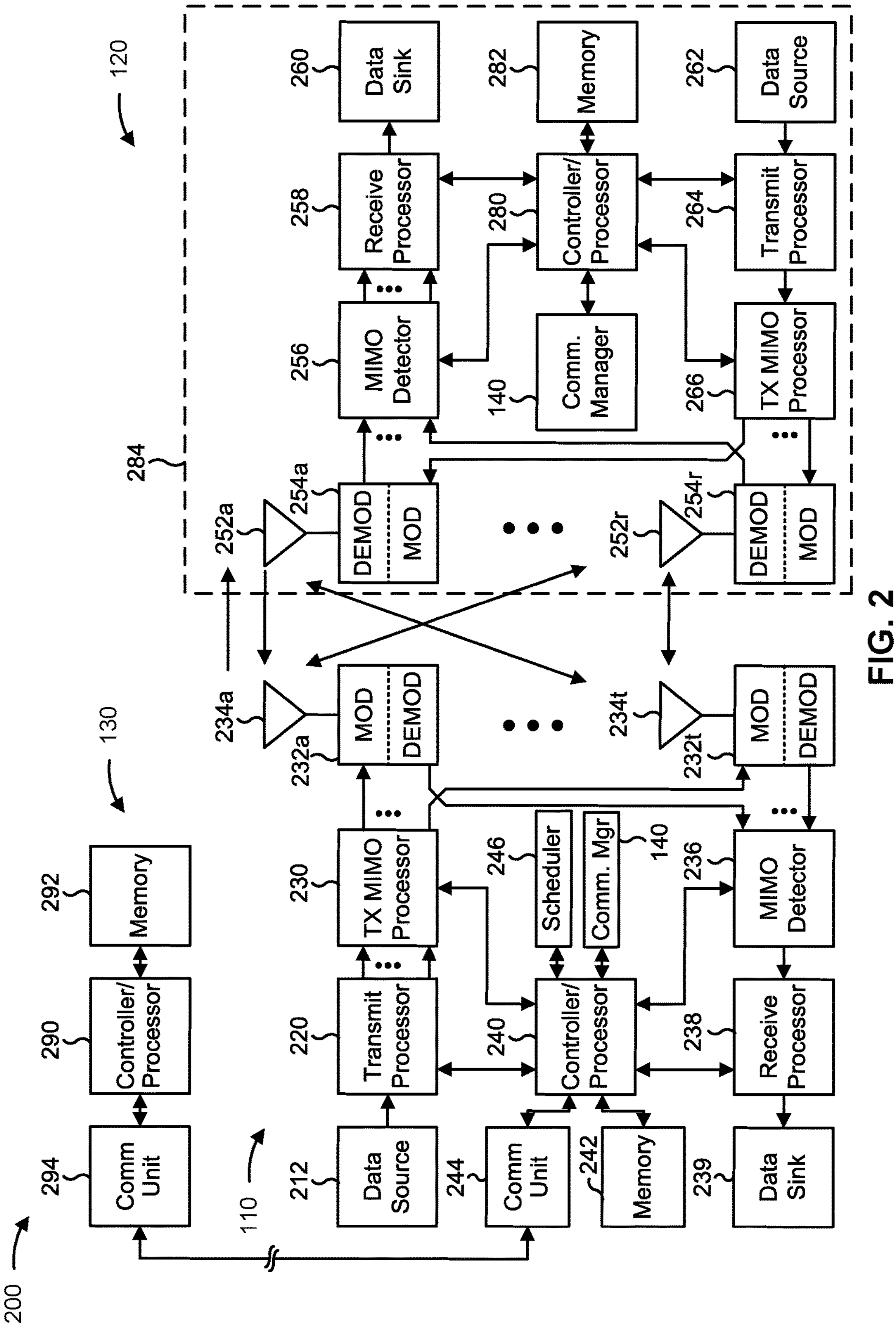
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with inter-encoder signaling for network encoder selection, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. In some aspects, a network node described herein may be the UE 120, may be included in the UE 120, or may include one or more components of the UE 120 shown in FIG. 2. In some aspects, a network node described herein may be the base station 110, may be included in the base station 110, or may include one or more components of the base station 110 shown in FIG. 2. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a first network node includes means for receiving, from a UE, an indication to perform network coding for a communication; and/or means for selectively transmitting, based at least in part on determining whether the network coding is to be performed by the first network node or a second network node, the communication using network coding. In some aspects, the means for the first network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
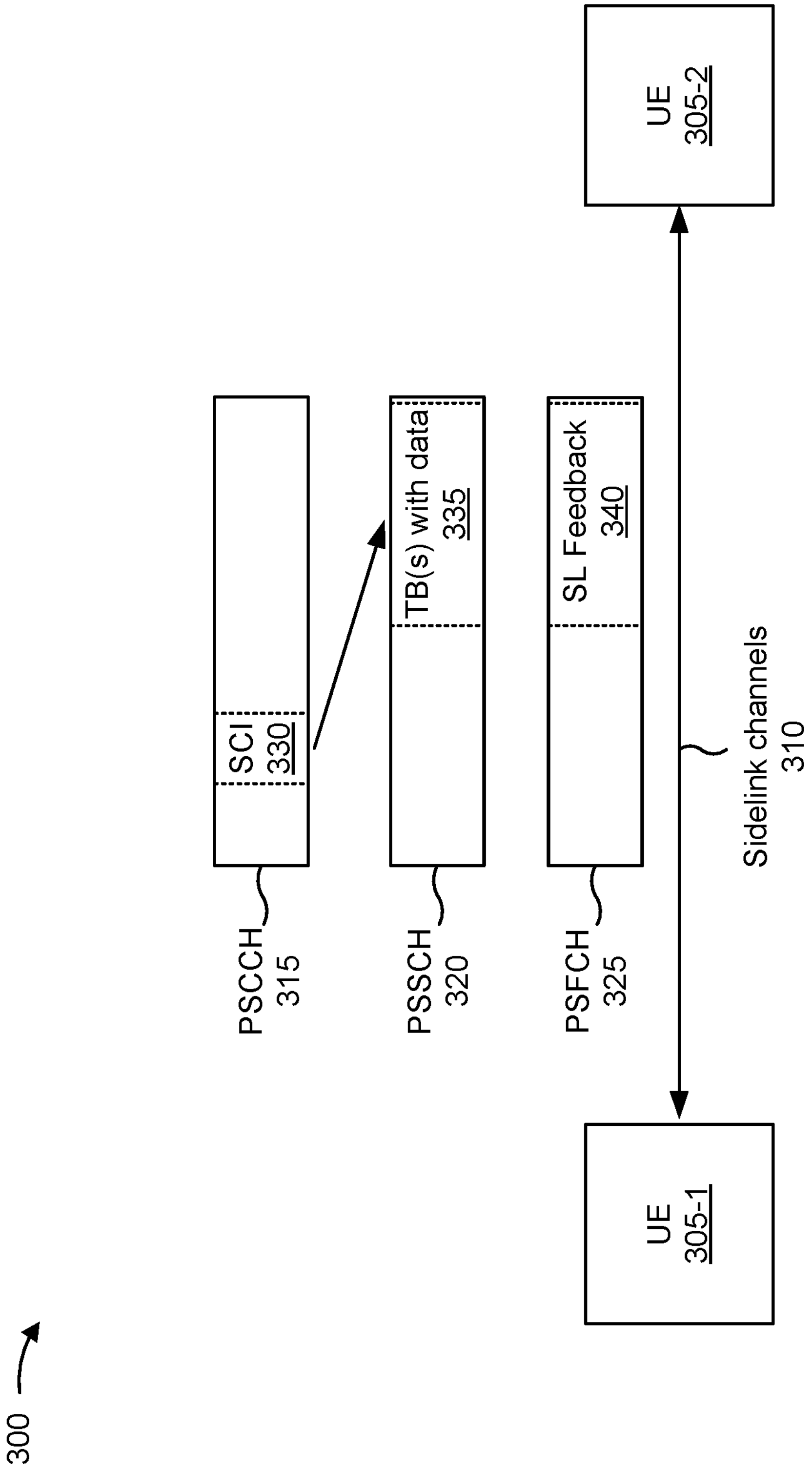
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, a sidelink communication may become corrupted, for example, as a result of a transmission error. This corruption may be referred to as an "erasure" of the communication. The sidelink communication may be "retransmitted" by a network node, such as a base station or a UE (e.g., a roadside unit), using network coding. The UE 305 may be configured to recover the erased communication based at least in part on the retransmission using network coding.

As indicated above, FIG. 3 is provided as an example. Other examples may differ from what is described with respect to FIG. 3.

Figure 4:
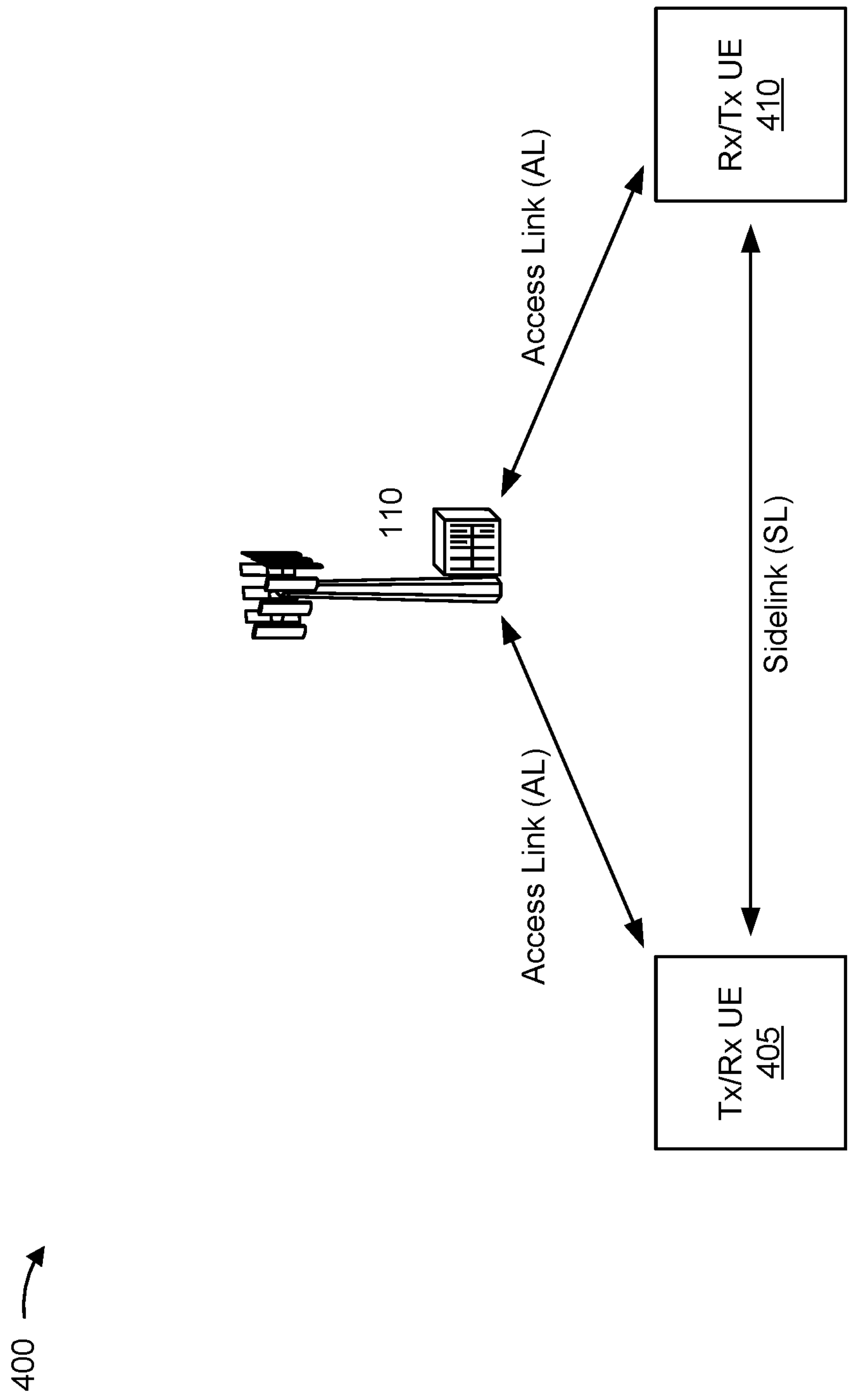
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
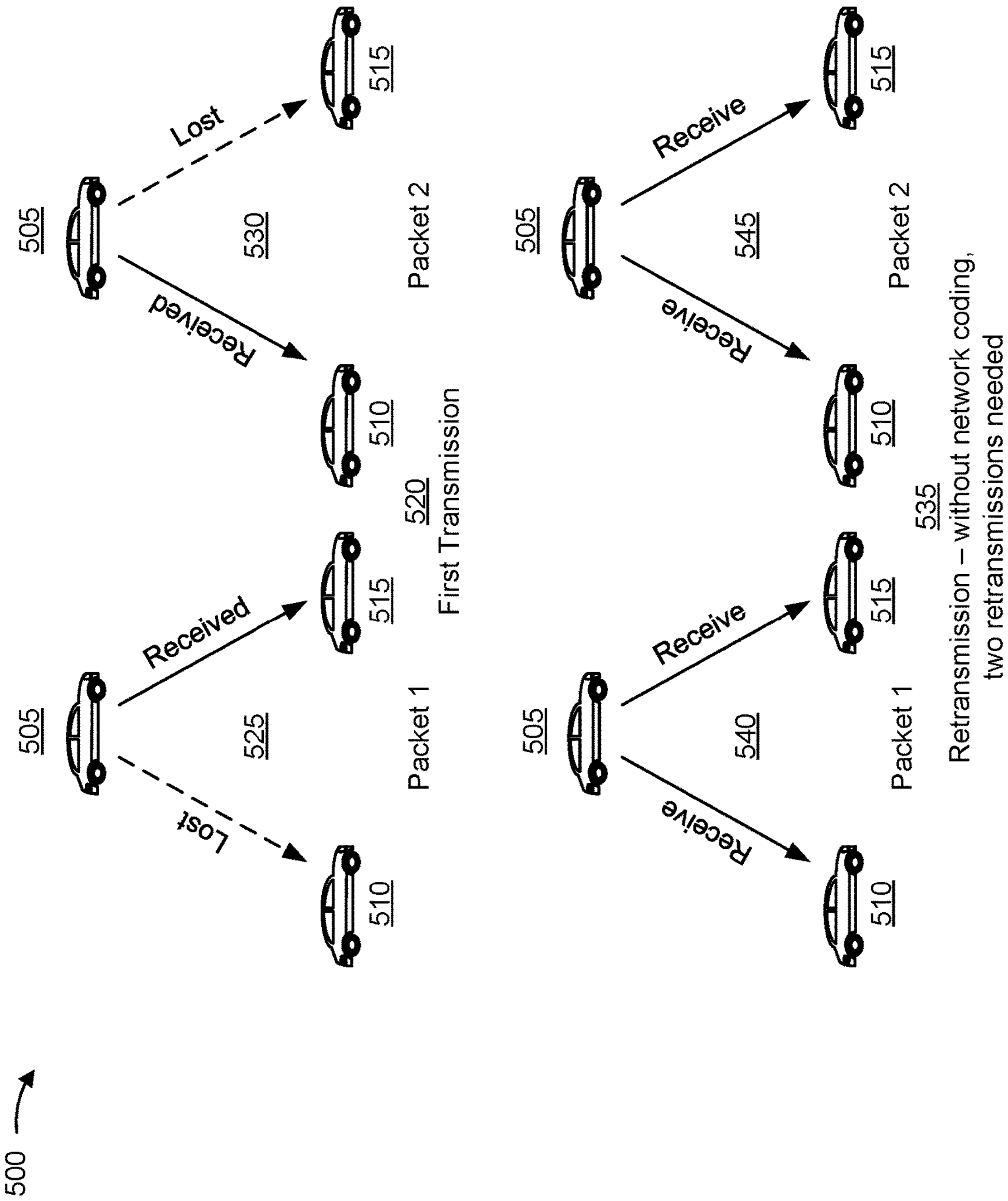
FIG. 5 is a diagram illustrating an example of communications without using network coding, in accordance with the present disclosure.

FIG. 5 is a diagram illustrating an example 500 of communications without using network coding.

As shown in FIG. 5, a UE, such as a transmitting UE 505, may transmit communications to one or more receiving UEs, and may be associated with a roadside unit, a network node, and/or a base station, among other examples. For example, the transmitting UE 505 may transmit one or more communications to a first receiving UE 510 associated with a first receiving vehicle and a second receiving UE 515 associated with a second receiving vehicle. In some aspects, the transmitting UE 505 may relay one or more communications received from an originating UE (not shown) to the first receiving UE 510 and to the second receiving UE 515. The UEs 505, 510, and/or 515 may correspond to one or more UEs described elsewhere herein, such as the UE 120 and/or the UE 305.

As shown by reference number 520, in a first transmission, the transmitting UE 505 may transmit a first communication and a second communication to a first receiving UE 510 associated with a first receiving vehicle and to a second receiving UE 515 associated with a second receiving vehicle. In some aspects, the communications may be P2P communications, such as sidelink communications. Additionally, or alternatively, the communications may include packets. For example, the first communication may be a P2P communication that includes a first packet (e.g., "Packet 1") and the second communication may be a second P2P communication that includes a second packet (e.g., "Packet 2"). However, the communications are not limited to P2P communications, and are not limited to including packets, and may be any type of communication. As shown by reference number 525, the first receiving UE 510 may fail to receive the first communication, and the second receiving UE 515 may receive the first communication. As shown by reference number 530, the first receiving UE 510 may receive the second communication, and the second receiving UE 515 may fail to receive the second communication.

As shown by reference number 535, if the transmitting UE 505 does not use network coding, then the transmitting UE 505 may retransmit both the first communication and the second communication (e.g., for a total of two retransmissions). For example, as shown by reference number 540, the transmitting UE 505 may retransmit the first communication because the first receiving UE 510 previously failed to receive the first communication. Furthermore, as shown by reference number 545, the transmitting UE 505 may retransmit the second communication because the second receiving UE 515 previously failed to receive the second communication.

As described in more detail below, network coding may be used to combine communications, thereby reducing the number of required retransmissions. Network coding may provide advantages associated with retransmission without increasing network load or interference, thereby improving network performance.

As indicated above, FIG. 5 is provided as an example. Other examples may differ from what is described with respect to FIG. 5.

Figure 6:
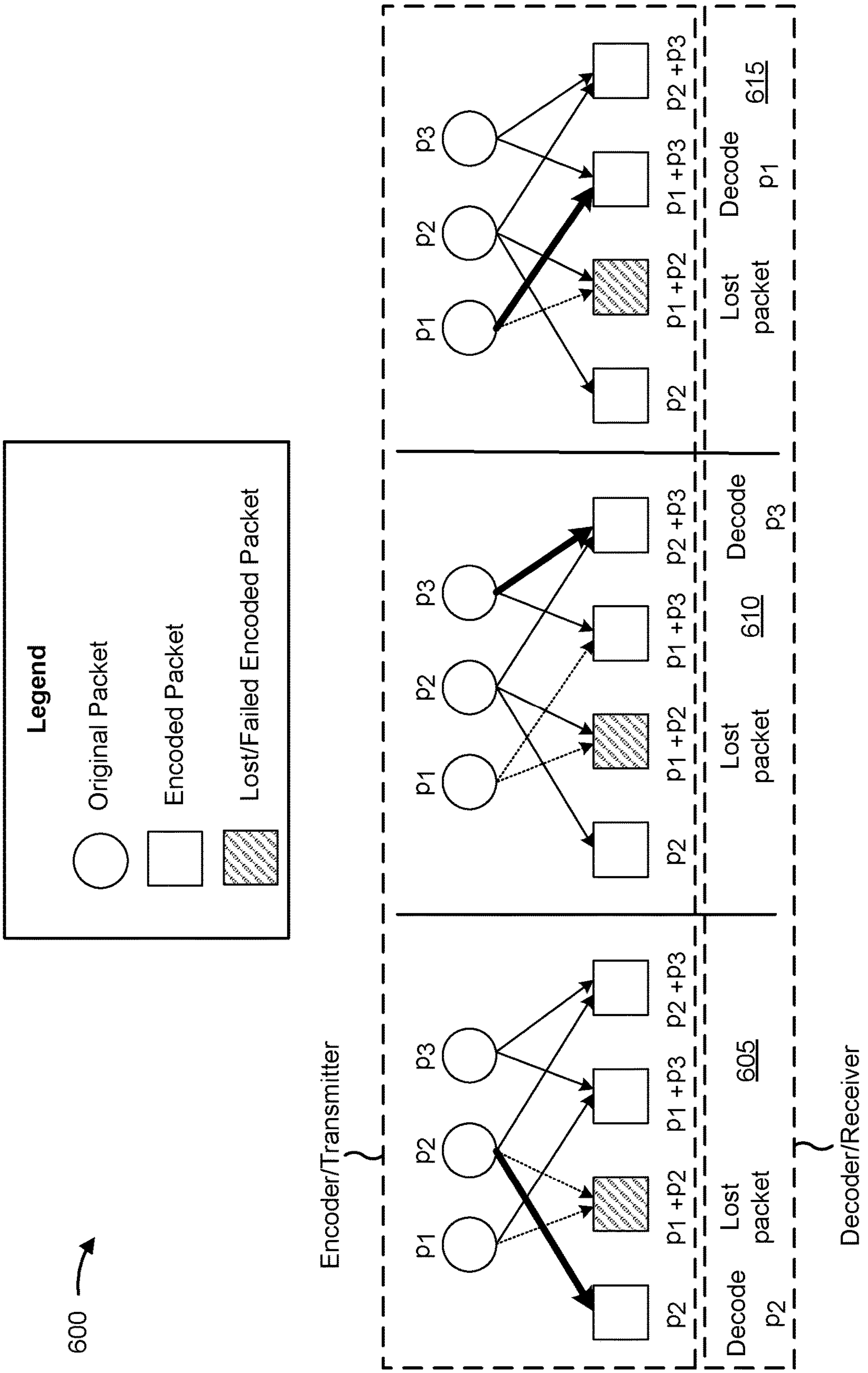
FIG. 6 is a diagram illustrating an example of erasure coding and recovery, in accordance with the present disclosure.

FIG. 6 is a diagram illustrating an example 600 of erasure coding and recovery, in accordance with various aspects of the present disclosure.

As shown in FIG. 6, an encoder (or transmitter) associated with a network node, such as transmitting UE 505, may encode data, shown as a set of original packets (p1, p2, and p3), into a set of encoded packets using network coding. While the example of FIG. 6 uses "packets" as example data, it is understood that the data may include any type of communication (e.g., transport blocks), and is not limited to packets. An encoded packet may be the same as an original packet, may be a redundancy version of an original packet, may include a combination of multiple original packets (e.g., a subset of the original packets), and/or may include a redundancy version of the combination. The number of encoded packets may be the same as or different than the number of original packets. In example 600, the encoder encodes K original packets (where K=3) into N encoded packets (where N=4). The encoder transmits the encoded packets to a decoder (or receiver) associated with the transmitting UE 505. The decoder uses network coding to decode the encoded packets and recover the original packets. In some aspects, the process of using network coding to decode and recover packets may be referred to as erasure coding.

In example 600, the encoder encodes three original packets (p1, p2, and p3) into four encoded packets (that carry p2, p1+p2, p1+p3, and p2+p3, respectively) and transmits the four encoded packets to the decoder. The packet carrying p1+p2 is not successfully received by the decoder. In a first operation 605, the decoder decodes the packet carrying p2. In a second operation 610, the decoder obtains p3 from the packet containing p2+p3 because the decoder has already decoded p2 and can use combining to obtain p3 from p2+p3. In a third operation 615, the decoder obtains p1 from the packet containing p1+p3 because the decoder has already decoded p3 and can use combining to obtain p1 from p1+p3. In some aspects, an encoded packet may include an indication (e.g., in a header of the encoded packet) that indicates the original packet(s) that are included in the encoded packet.

In some aspects, the encoder may continue to transmit encoded packets (e.g., the same combination of encoded packets or different combinations of encoded packets) to the decoder until the encoder receives a notification from the decoder. For example, the decoder may successfully receive the original packets or may abort decoding, which may trigger the decoder to send a notification to the encoder. The notification may include, for example, an acknowledgement (ACK) and/or a stop message (STOP). In some aspects, the decoder may transmit an ACK for each original packet that is successfully received. Additionally, or alternatively, the decoder may transmit an ACK upon successful reception of all of the original packets. Upon receiving the notification, the encoder may encode additional data (e.g., a new set of original packets, such as p4, p5, and p6), and may transmit encoded packets to the decoder, in a similar manner as described above, until all of the data has been transmitted and/or successfully received.

In some aspects, the encoder may perform inner coding to generate redundant packets from the original packets. A redundant packet may be a copy of an original packet or a redundancy version of an original packet. For example, the encoder may apply inner coding to generate K' original plus redundant packets from K original packets. The encoder may then perform outer coding to generate N encoded packets from the K' original plus redundant packets, in a similar manner as described above.

In some aspects, the erasure coding may be viewed as a linear system (e.g., over a Galois field) with three variables and four linearly independent constraints. For example, the three variables may correspond to the original packets (e.g., p1, p2, and p3) and the four linearly independent constraints may correspond to the four encoded packets (e.g., the four encoded packets that carry p2, p1+p2, p1+p3, and p2+p3). Using the linear system, any of the three variables that have been subject to an erasure (e.g., transmission error) may be recovered based at least in part on a portion of the three original packets and based at least in part on a portion of the four encoded packets. An example representation of the linear system is shown below:

$$\begin{bmatrix} 1 & 0 & 0 \\ 0 & 1 & 0 \\ 0 & 0 & 1 \\ 1 & 1 & 1 \end{bmatrix} \cdot [a\ b\ c]^T = [a\ b\ c\ a \oplus b \oplus c]^T$$

where a, b, and c correspond to the three original packets, and T represents a transpose of the function.

Erasure coding and recovery may enable a UE to recover a communication that has been erased (e.g., lost or corrupted) during transmission. The recovery of the erased communication, without requiring retransmission by the network node, may reduce the overall number of retransmissions by the network node and may reduce the overall load on the network. Furthermore, according to the techniques described herein, a group of network nodes can select an appropriate network node to perform network coding and retransmission, which improves resource utilization and reduces overhead associated with network coding.

As indicated above, FIG. 6 is provided as an example. Other examples may differ from what is described with respect to FIG. 6.

Figure 7:
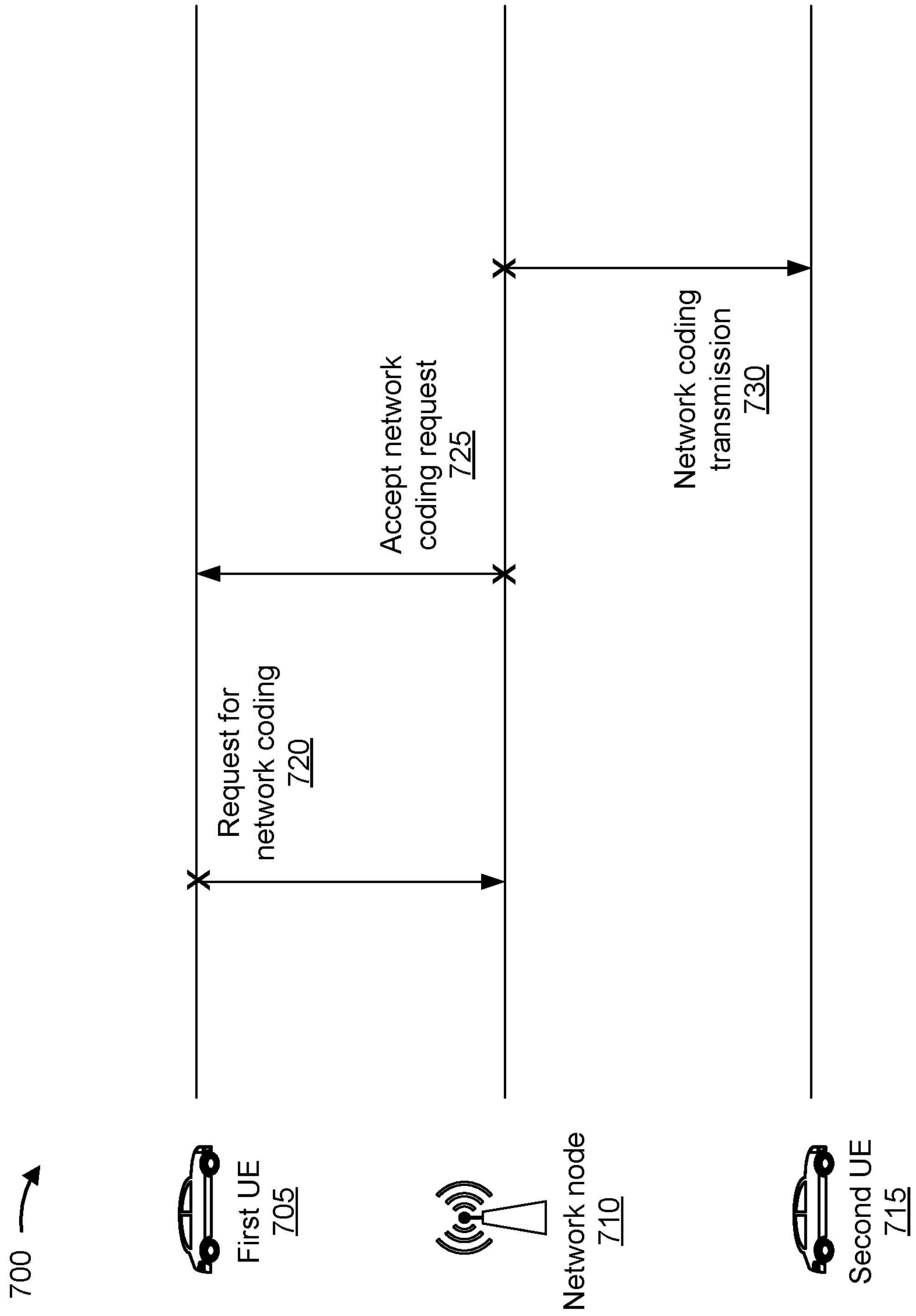
FIG. 7 is a diagram illustrating an example of network coding using a single network node, in accordance with the present disclosure.

FIG. 7 is a diagram illustrating an example 700 of network coding using a single network node, in accordance with various aspects of the present disclosure.

As shown in FIG. 7, a first UE 705 and a second UE 715 may be in communication with a network node 710. In some aspects, the first UE 705 may be a transmitting UE associated with a first vehicle and the second UE 715 may be a receiving UE associated with a second vehicle. However, one or both of the first UE 705 and the second UE 715 may be configured to receive and transmit data. The network node 710 may be a base station or a UE, such as a roadside unit or a vehicle. The first UE 705, the network node 710, and/or the second UE 715 may correspond to one or more of the UEs described herein, such as UE 120, UE 305, UE 505, UE 510, and/or UE 515.

As shown in connection with reference number 720, the first UE 705 may transmit, and the network node 710 may receive, a request for network coding. Network coding may be used to combine communications, such as by combining a first communication and a second communication using an exclusive or (XOR) operation. The first UE 705 may transmit the request for network coding to the network node 710 based at least in part on a configuration associated with the UE 705 and/or a configuration associated with the network node 710. For example, the first UE 705 may be configured to transmit all network coding requests to the network node 710. In some aspects, the network node 710 may be the only network node within an area associated with the first UE 705 and/or may otherwise be the default network node to which the first UE 705 transmits all network coding requests.

As shown in connection with reference number 725, the network node 710 may accept the network coding request. In some aspects, the network node 710 may be the only network node configured to accept network coding requests from the first UE 705 and/or may be the default network node for performing network coding for the first UE 705. The network node 710 may transmit, and the first UE 705 may receive, an indication that the network node 710 has accepted the request to perform the network coding.

As shown in connection with reference number 730, the network node 710 may transmit, and the second UE 715 may receive, a transmission using network coding. The transmission using network coding may include a function of the first communication and the second communication, such as a combination of the first communication and the second communication using an exclusive or (XOR) operation.

As described above (e.g., in connection with FIG. 5), a network node may transmit a first communication and a second communication to a first receiving UE associated with a first receiving vehicle and a second receiving UE associated with a second receiving vehicle. The first receiving UE may fail to receive the first communication, but may receive the second communication, while the second receiving UE may receive the first communication, but may fail to receive the second communication. If the network node does not use network coding, then the network node may be required to retransmit both the first communication and the second communication (e.g., for a total of two retransmissions). For example, the network node may retransmit the first communication because the first receiving UE previously failed to receive the first communication, and may retransmit the second communication because the second receiving UE previously failed to receive the second P2P communication.

In contrast, if the network node uses network coding to combine the communications, then the network node may only need to retransmit a single communication. In some aspects, the single communication may be a combined communication that includes both the first communication and the second communication. For example, the network node may combine the first communication and the second communication using an exclusive or (XOR) operation. Thus, the use of network coding may reduce the number of resources required for the retransmission, and thus reduce the overall load on the network.

In some aspects, multiple network nodes may be configured to accept, from a UE, a network coding request associated with a communication. For example, the UE may transmit the network coding request to multiple network nodes, or may broadcast the network coding request to any number of network nodes within a broadcast area of the UE. If multiple network nodes were to accept the network coding request and retransmit the communication, the benefits of network coding may not be realized. Referring to the example above, network coding enables the network node to combine and retransmit two communications as a single communication. Therefore, the load on the network is reduced (e.g., from requiring two resources to requiring one resource). However, if two network nodes were to accept the network coding request and retransmit the packet, two resources would once again be required, thereby negating the benefits of the network coding. If more than two network nodes were to accept the network coding request, network coding could result in the use of more resources than if network coding were not used.

Some techniques and apparatuses described herein enable multiple network nodes to decide which of the network nodes will accept a request for network coding. For example, a UE may transmit (e.g., broadcast) a network coding request to multiple network nodes, such as a first network node and a second network node. The first network node may receive the request to perform network coding for the communication, and may determine whether the network coding is to be performed by the first network node or another network node (e.g., the second network node). The first network node may selectively transmit a communication using network coding based at least in part on determining whether or not the first network node is to perform the network coding. For example, based at least in part on the first network node determining that the first network node is to perform the network coding, the first network node may transmit the communication using network coding. Alternatively, based at least in part on the first network node determining that another network node (e.g., the second network node) is to perform the network coding, the first network code may refrain from transmitting the communication using network coding.

In some aspects, the multiple network nodes may receive the network coding request from the UE, and may communicate with each other to determine which of the multiple network nodes will accept the network coding request. Therefore, only one of the multiple network nodes may accept the network coding request and transmit the communication using network coding. The network nodes may determine whether or not to accept the network coding request based, for example, on a location of the first network node, a location of one or more other network nodes, a location of the UE, whether the network node is a closest network node of the multiple network nodes to the UE, a boundary associated with the network node, a blockage between the network node and the UE, an overload condition of the network node, and/or whether another network node has already determined whether or not to accept the network coding request. In some aspects, a network node may be considered a "closest" network node to the UE if the network node is the closest in distance, compared to the other network nodes, to the UE. In some aspects, an overload condition may indicate, among other examples, that the network node is transmitting or performing network coding for a number (e.g., greater than a threshold number) of communications such that the network node may not be able to transmit additional communications.

The techniques and apparatuses described herein enable multiple network nodes to communicate and decide which of the network nodes will accept a request for network coding. Therefore, only one of the multiple network nodes may accept a network coding request sent by the UE to the multiple network nodes. By preventing multiple network nodes from accepting a network coding request, the benefits of network coding, such as a reduced number of resources and a reduced load on the network, can be fully realized.

As indicated above, FIG. 7 is provided as an example. Other examples may differ from what is described with respect to FIG. 7.

Figure 8:
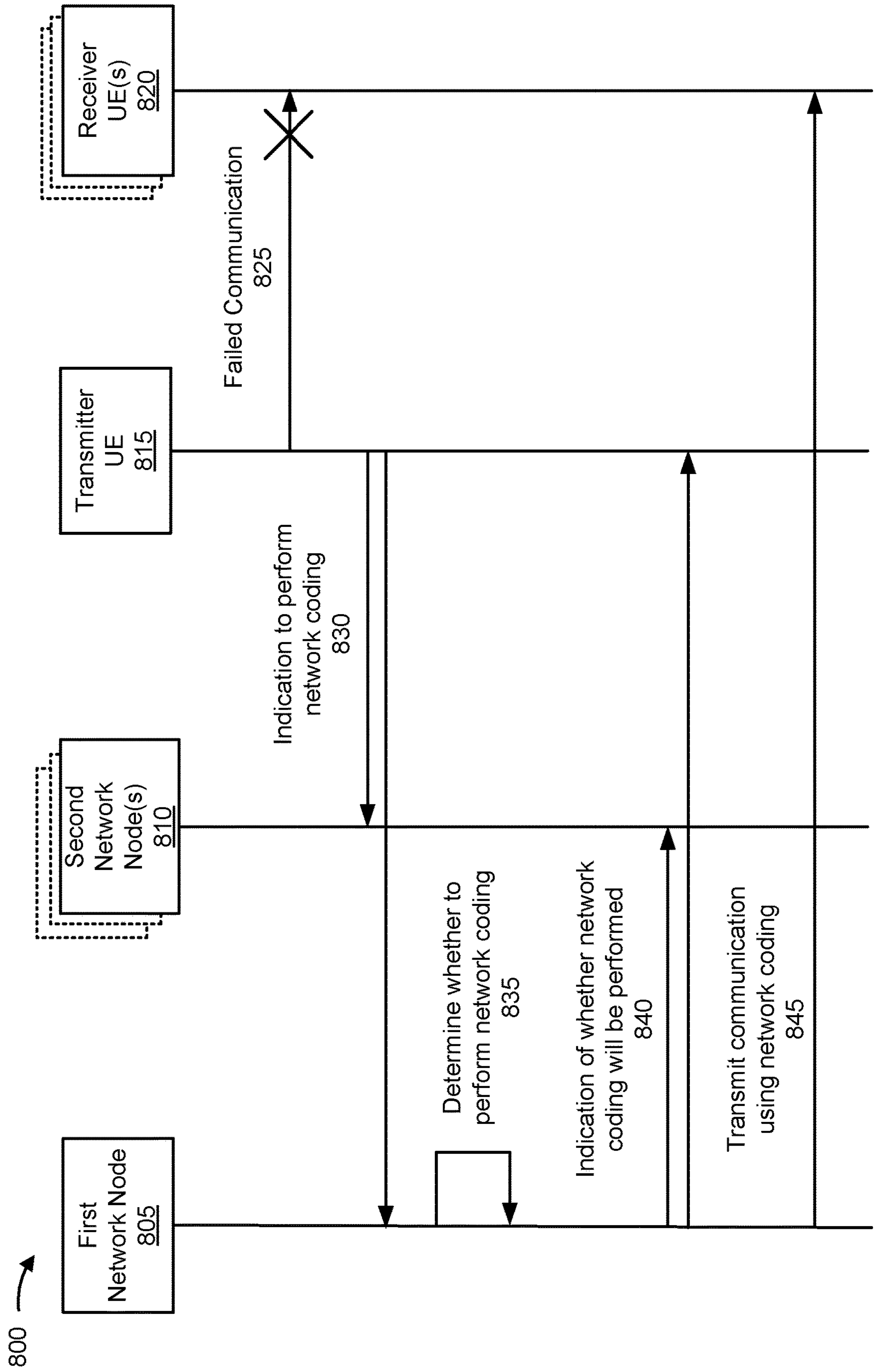
FIG. 8 is a diagram illustrating an example associated with inter-encoder signaling for network encoder selection, in accordance with the present disclosure.

FIG. 8 is a diagram illustrating an example 800 of inter-encoder signaling for network encoder selection, in accordance with the present disclosure.

As shown in FIG. 8, one or more network nodes may be in communication with one or more UEs. The one or more network nodes may be encoders for network coding based retransmission of communications transmitted by a transmitter UE 815. For example, a first network node 805 and/or a second network node 810 may be in communication with a transmitter UE 815 and/or one or more receiver UEs 820. In some aspects, the first network node 805 and/or the second network node 810 may correspond to any of the network nodes described above, such as network node 505 and/or network node 710, and may be a UE, such as a roadside unit or a vehicle, or may be a base station. As shown, there may be a plurality of second network nodes. The techniques described herein are described with regard to "a second network node" for clarity, but it should be understood that these techniques can be performed for a group of any number of network nodes. The transmitter UE 815 and/or the one or more receiver UEs 820 may correspond to any of the UEs described above, such as UE 120, UE 305, UE 505, UE 510, UE 515, UE 705, and/or UE 715. For example, the receiver UEs 820 may include a first receiver UE 820 associated with a first vehicle and a second receiver UE 820 associated with a second vehicle. The receiver UEs 820 may include any number of UEs. In some aspects, there may be only a single receiver UE 820. In some aspects, there may be multiple receiver UEs 820. While described as a "transmitter UE" and "receiver UEs," both the transmitter UE 815 and any of the receiver UEs 820 may be configured to both transmit and receive information.

As shown in connection with reference number 825, the transmitter UE 815 may transmit one or more communications. In some aspects, the communications may be P2P communications, such as sidelink communications. Additionally, or alternatively, the communications may include one or more packets or transport blocks. For example, a first communication from the transmitter UE 815 to the first receiver UE 820 may be a P2P communication that includes a first packet, and a second communication from the transmitter UE 815 to the second receiver UE 820 may be a second P2P communication that includes a second packet. However, the communications are not limited to P2P communications, and are not limited to including packets, and may be any type of communication. In some aspects, one or more of the communications may be transmitted by another UE, such as a third receiver UE 820, and not by the transmitter UE 815.

In some aspects, communications, such as the first communication and/or the second communication, may become lost or corrupted, for example, as a result of a transmission error, channel conditions, changing locations of UEs, or a similar issue. This loss or corruption of the communication may be referred to as an "erasure" of the communication. For example, the first receiver UE 820 may fail to receive the first communication, but may receive the second communication. In contrast, the second receiver UE 820 may receive the first communication, but may fail to receive the second communication. The first receiver UE 820 may therefore have an erasure associated with the first transmission, while the second receiver UE 820 may have an erasure associated with the second transmission. Thus, the transmitter UE 815 or another node may need to retransmit the communications (e.g., the first communication and the second communication) such that they are received by the first receiver UE 820 and the second receiver UE 820.

In some aspects, if the transmitter UE 815 does not use network coding to retransmit the communications, then the transmitter UE 815 may need to retransmit both the first communication and the second communication (e.g., for a total of two retransmissions). For example, the transmitter UE 815 may retransmit the first communication because the first receiver UE 820 previously failed to receive the first communication. Furthermore, the transmitter UE 815 may retransmit the second communication because the second receiver UE 820 previously failed to receive the second communication. Network coding, as described in detail below, may reduce the number of transmissions needed, and may therefore reduce the number of resources required for those transmissions.

As shown in connection with reference number 830, the transmitter UE 815 may transmit, and at least one of the first network node 805 or the second network node 810 may receive, an indication (e.g., request) to perform network coding for a communication, such as the communication shown in connection with reference number 825. The transmitter UE 815 may transmit the request for network coding to multiple network nodes, such as the first network node 805 and the second network node 810. Additionally, or alternatively, the transmitter UE 815 may broadcast, to multiple network nodes within a broadcast area of the transmitter UE 815, the request for network coding. In some aspects, the transmitter UE 815 may transmit the request for network coding to a single network node (e.g., via a unicast connection), and the single network node may provide the request to one or more other network nodes or inform the one or more other network nodes of the request. The first network node 805 and/or the second network node 810 may receive the request for network coding that was transmitted and/or broadcasted to the multiple network nodes by the transmitter UE 815. The communication can be an aperiodic communication, a periodic communication, or another form of communication.

As described herein, network coding may reduce a number of resources required, and therefore reduce a load on the network, by combining multiple transmissions into a single transmission. Referring to the example above, network coding may enable the first network node 805 to combine and retransmit the first communication and the second communication as a single network-coded communication. Therefore, the load on the network is reduced (e.g., from requiring two resources to requiring one resource). However, if two network nodes (e.g., first network node 805 and second network node 810) were to accept the network coding request and retransmit the communication, two resources would once again be required, negating the benefits of network coding. According to some techniques described herein, the network nodes may communicate with each other in order to determine which network node will accept the request for network coding such that only one of the network nodes transmits the communication using network coding.

As shown in connection with reference number 835, the first network node 805 may determine whether to perform network coding for the communication. In some aspects, the first network node 805 may determine whether the first network node 805 is to perform the network coding based at least in part on a location of the first network node 805, a location of the second network node 810, a location of the transmitter UE 815, and/or one or more locations corresponding to one or more of the receiver UEs 820. In some cases, determining whether the first network node 805 is to perform the network coding may include determining that the first network node 805 is to perform the network coding. Alternatively, determining whether the first network node 805 is to perform the network coding may include determining that the first network node 805 is not to perform the network coding and/or determining that another network node (e.g., the second network node 810) is to perform the network coding.

The first network node 805 may determine the location of the second network node 810 based at least in part on receiving a configuration of the second network node 810. For example, the configuration may indicate the location of the second network node 810. Additionally, or alternatively, the first network node 805 may determine the location of one or more other network nodes within an area relative to or associated with the first network node 805 and/or within an area associated with the transmitter UE 815. An area relative to the first network node 805 may be centered on the first network node 805 (e.g., a circle or other shape around the first network node 805), may be defined by the first network node 805, or the like. In some aspects, the first network node 805 may transmit, and the second network node 810 may receive, location information, such as GNSS location information, indicating a location of the first network node 805. Additionally, or alternatively, the second network node 810 may transmit, and the first network node 805 may receive, location information, such as GNSS location information, indicating a location of the second network node 810. The first network node 805 may communicate with the second network node 810 (for example, to exchange the location information) using, for example, sidelink control information (e.g., SCI-2), a medium access control (MAC) message (e.g., a MAC control element (MAC-CE), a MAC header, or a MAC sub-header), radio resource control message, and/or a physical (PHY) layer message.

In some aspects, the first network node 805 may determine (e.g., compute) a distance between the first network node 805 and the transmitter UE 815. Additionally, or alternatively, the first network node 805 may determine a distance between one or more other network nodes and the transmitter UE 815 (e.g., a distance between the second network node 810 and the transmitter UE 815). The first network node 805 may determine whether the network coding is to be performed by the first network node 805 or the second network node 810 based at least in part on whether the first network node 805 is a closest network node, of the first network node 805 and the second network node 810, to the transmitter UE 815. In some aspects, the first network node 805 may determine that the first network node 805 is the closest network node to the transmitter UE 815, and therefore the first network node 805 may determine that the first network node 805 is to perform (e.g., will perform) the network coding. In some aspects, the first network node 805 may determine that the second network node 810 is closer to the transmitter UE, and therefore the first network node 805 may determine that the first network node 805 is not to perform (e.g., will not perform) the network coding and/or may determine that the second network node 810 is to perform the network coding. Thus, the first network node 805 and/or the second network node 810 may determine a closest network node to perform retransmission of the communication using network coding.

As discussed above, there may be any number of network nodes in communication with the transmitter UE 815. In an example involving three network nodes in communication with a UE, a first network node may determine (e.g., compute) a distance between the UE and each of the first network node, a second network node, and a third network node. For example, the first network node may determine a distance between the first network node and the UE, a distance between the second network node and the UE, and a distance between the third network node and the UE. Based at least in part on determining the distance between the UE and each of the first network node, the second network node, and the third network node, the first UE may determine whether or not the first network node is to perform network coding for a communication. For example, based at least in part on determining that the first network node is the closest of the three network nodes to the UE, the first network node may determine that the first network node is to perform the network coding for the communication. Alternatively, based at least in part on determining that the first network node is not the closest of the three network nodes to the UE, the first network node may determine that the first network node is not to perform the network coding for the communication. Instead, one of the second network node or the third network node may determine to perform the network coding for the communication based at least in part on either the second network node or the third network node determining that it is the closest network node to the UE of the first network node, the second network node, and the third network node.

In some aspects, the first network node 805 may be associated with a boundary. For example, the boundary may be a zone that is associated with an identifier, such as a zone ID. The zone that is associated with the zone ID may have vertices that are defined by one or more GNSS locations. In some aspects, the first network node 805 may only accept requests to perform network coding if the transmitter UE 815 is within an area defined by the boundary (e.g., is within a zone identified by the zone ID). Thus, upon receiving a request to perform network coding from the transmitter UE 815, the first network node 805 may determine whether or not to accept the request, and perform the network coding, based at least in part on whether or not the transmitter UE 815 is located within the boundary (e.g., when the request was transmitted). For example, the request to perform the network coding may include a GNSS location of the transmitter UE 815 and/or may include a zone ID of the zone in which the transmitter UE 815 transmits the request for the network coding.

In some aspects, the first network node 805 may monitor for one or more communications received from the second network node 810. For example, the first network node 805 may monitor for one or more of a feedback collection communication (e.g., feedback collection packet) received from the second network node 810, a network coding communication (e.g., network coding packet) received from the second network node 810, or an acknowledgement message sent from the transmitter UE 815 to the second network node 810. A feedback collection communication is a communication that provides feedback regarding communications of a network node so that other network nodes can track performance of communications associated with the network node. A network coding communication is a communication generated using network coding. The first network node 805 may determine whether the network coding is to be performed by the first network node 805 or the second network node 810 based at least in part on the one or more communications received from the second network node 810. For example, the first network node 805 may monitor for an acknowledgement message sent from the transmitter UE 815 to the second network node 810. Based at least in part on detecting the acknowledgement message indicating that the second network node 810 has accepted the request to perform network coding for the communication, the first network node 805 may determine not to perform network coding for the communication.

As shown in connection with reference number 840, the first network node 805 may transmit, and the second network node 810 may receive, an indication of whether or not the network coding will be performed by the first network node 805. For example, the first network node 805 may transmit an indication to the second network node 810 that the first network node 805 will not perform network coding for a communication (e.g., even if the first network node 805 is the closest node to the transmitter UE 815). As another example, the first network node 805 may transmit an indication to the second network node 810 that the first network node 805 will perform network coding for the communication.

In some aspects, the first network node 805 may store or have access to information indicating communications for which the first network node 805 is to perform network coding. For example, the first network node 805 may store or have access to a data structure that indicates whether the first network node 805 is to perform network coding for each of a set of communications. Additionally, or alternatively, the data structure may indicate which network node is to perform network coding for each of the set of communications, or whether any network node has accepted a request to perform network coding for each of the set of communications.

In some aspects, the first network node 805 may transmit, and the second network node 810 may receive, an indication that the first network node 805 will not perform network coding for communications of the transmitter UE 815 if the transmitter UE 815 is within an area. For example, the first network node 805 may transmit an indication that the first network node 805 will not perform network coding for communications of the transmitter UE 815 that is within the area based at least in part on determining that there is a blockage in the area between the first network node 805 and the transmitter UE 815. A blockage may include anything that may block or disturb a communication between first network node 805 and the transmitter UE 815, such as an object, a building, a vehicle, etc. In some aspects, the second network node 810, based at least in part on receiving a request for network coding from the transmitter UE 815 that is within the area, and based at least in part on receiving the indication that the first network node 805 will not accept the request for network coding, may accept the request for network coding, even if the first network node 805 is the closest network node to the transmitter UE 815.

The indication that first network node 805 will not perform network coding for communications of the transmitter UE 815 that is within the area may include a location-based average measurement value (such as a location-based average RSRP, which may enable other network nodes to determine that the first network node 805 is more suited to transmit in the area based at least in part on the average measurement value and thus to override the indication), an identifier associated with the area, and/or a GNSS identification associated with the area. The location-based average measurement value may identify an average measurement value determined by the first network node 805 in an area, such as for network coding based retransmissions in the area. For example, the first network node 805 may transmit, to the second network node 810, a GNSS identifier associated with an area for which the first network node 805 will not accept any requests for network coding. The indication of whether the first network node 805 will not perform network coding for communications of the transmitter UE 815 that is within the area may include a bit, such as a bit of a communication between the first network node 805 and the second network node 810. For example, a first state of the bit may indicate that the first network node 805 will perform network coding for communications of the transmitter UE 815 that is within the area, and a second state of the bit may indicate that the first network node 805 will not perform network coding for communications of the transmitter UE 815 that is within the area.

In some aspects, the first network node 805 may transmit, and the second network node 810 may receive, an indication that the first network node 805 will not transmit any communications using network coding due to an overload state of the first network node 805. For example, the first network node 805 may determine that the first network node 805 does not have the resources (e.g., processing resources and/or memory resources) required to perform network coding and/or to transmit communications using network coding. The indication that the first network node 805 will not transmit any communications using network coding may include at least one of a start time (e.g., a starting slot) at which the first network node 805 will not transmit any communications using network coding or an end time (e.g., an ending slot) at which the first network node 805 will resume transmitting communications using network coding. In some aspects, the second network node 810, based at least in part on receiving a request for network coding from the transmitter UE 815, and based at least in part on receiving the indication from the first network 805 that the first network node 805 will not perform the network coding due to the overload state, may accept the request for network coding, even if the first network node 805 is the closest network node to the transmitter UE 815.

The indication that the first network node 805 will not transmit any communications using network coding due to an overload state of the first network node 805 may include a bit, such as a bit of a communication between the first network node 805 and the second network node 810. A first state of the bit may indicate that the first network node 805 is in an overload state and a second state of the bit may indicate that the first network node 805 is not in an overload state. Additionally, or alternatively, the bit may indicate that the first network node 805 has resumed (e.g., in a current slot), or is ready to resume (e.g., in a future slot indicated by the first network node 805), transmitting communications using network coding.

In some aspects, the first network node 805 may transmit, and the second network node 810 may receive, an indication that the first network node 805 has determined to transmit the communication using network coding. The indication that the first network node 805 has determined to transmit the communication using network coding may include an identifier associated with the communication (e.g., a packet ID). Additionally, or alternatively, the indication that the first network node 805 has determined to transmit the communication using network coding may include an identifier associated with the first transmitter UE 815 (e.g., a source ID). In some aspects, the second network node 810, based at least in part on receiving a request for network coding from the transmitter UE 815, and based at least in part on receiving the indication from the first network 805 that the first network node 805 will perform the network coding, may not accept the request for network coding.

As shown in connection with reference number 845, the first network node 805 may transmit (e.g., selectively transmit), and at least one of the receiver UEs 820 may receive, a transmission using network coding. The transmission using network coding may include two or more communications that are combined into a single communication. For example, the transmission using network coding may include a function of a first communication and a second communication, such as a combination of the first communication and the second communication using an exclusive or (XOR) operation.

In some aspects, the first network node 805 may selectively transmit the communication using network coding based at least in part on the determination by the first network node 805 whether or not to accept the request for network coding. For example, the first network node 805 may transmit the communication using network coding based at least in part on determining that the first network node 805 is to perform the network coding. Alternatively, the first network node 805 may not transmit (e.g., may refrain from transmitting) the communication using network coding based at least in part on determining that the first network node 805 is not to perform the network coding and/or that another network node (e.g., the second network node 810) is to perform the network coding.

In some aspects, the second network node 810 may perform one or more of the operations described herein as being performed by the first network node 805 (e.g., operations described in connection with reference numbers 835, 840, and/or 845). For example, the second network node 810 may receive the request from the transmitter UE 815 to perform network coding. The transmitter UE 815 may transmit and or broadcast the request to perform the network coding to both the first network node 805 and the second network node 810. The second network node 810 may determine whether or not to perform the network coding based at least in part on a location of the second network node 810, a location of the first network node 805, and/or a location of the transmitter UE 815. The second network node 810 may selectively transmit the one or more communications using network coding based at least in part on determining whether or not to accept the request to perform the network coding. The second network node 810 may transmit, to the first network node 805, to the transmitter UE 815, and/or to one or more other network nodes, an indication of whether or not the second network node 810 has determined to accept the request to perform the network coding.

As described above, multiple network nodes (e.g., the first network node 805 and the second network node 810 and, in some aspects, one or more other network nodes) may communicate to decide which of the network nodes will accept a request for network coding. Therefore, only one of the multiple network nodes may accept a request for network coding sent by a UE, such as the transmitter UE 815, to the multiple network nodes. By preventing multiple network nodes from retransmitting a communication, network coding may reduce the number of resources needed for the retransmission, and may therefore reduce the load on the network. It should be noted that, while example 800 describes interactions of two network nodes, the techniques described herein (such as in connection with example 800) can be applied for any number of network nodes. The reduction in resource usage for retransmission and load on the network realized by the techniques described herein may increase as the number of coordinating network nodes increases.

As indicated above, FIG. 8 is provided as an example. Other examples may differ from what is described with respect to FIG. 8.

Figure 9:
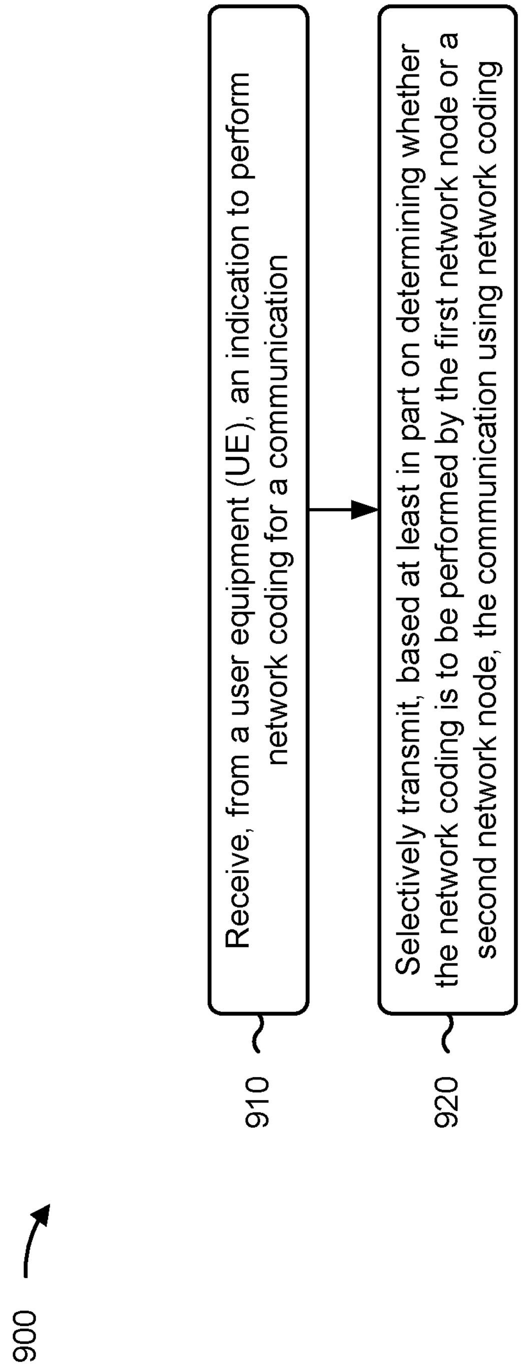
FIG. 9 is a diagram illustrating an example process associated with inter-encoder signaling for network encoder selection, in accordance with the present disclosure.

FIG. 9 is a diagram illustrating an example process 900 performed, for example, by a network node, in accordance with the present disclosure. Example process 900 is an example where a first network node (e.g., first network node 805, second network node 810) performs operations associated with inter-encoder signaling for network encoder selection.

As shown in FIG. 9, in some aspects, process 900 may include receiving, from a UE, an indication to perform network coding for a communication (block 910). For example, the first network node (e.g., using communication manager 140 and/or reception component 1002, depicted in FIG. 10) may receive, from a UE, an indication to perform network coding for a communication, as described above.

As further shown in FIG. 9, in some aspects, process 900 may include selectively transmitting, based at least in part on determining whether the network coding is to be performed by the first network node or a second network node, the communication using network coding (block 920). For example, the first network node (e.g., using communication manager 140, determination component 1008, and/or transmission component 1002, depicted in FIG. 10) may selectively transmit, based at least in part on determining whether the network coding is to be performed by the first network node or a second network node, the communication using network coding, as described above. In some aspects, the first network node may selectively transmit the communication based at least in part on at least one of a location of the first network node, a location of the second network node, or a location of the UE. For example, the first network node may determine whether to perform network coding for the communication based at least in part on at least one of a location of the first network node, a location of the second network node, or a location of the UE, as described elsewhere herein.

Process 900 may include additional aspects, such as any single aspect or any combination of aspects described below and/or in connection with one or more other processes described elsewhere herein.

In a first aspect, selectively transmitting the communication using network coding comprises refraining from transmitting the communication based at least in part on determining that the network coding is to be performed by the second network node.

In a second aspect, alone or in combination with the first aspect, process 900 includes determining whether the network coding is to be performed by the first network node or the second network node based at least in part on a location of the first network node, a location of the second network node, and a location of the UE.

In a third aspect, alone or in combination with one or more of the first and second aspects, determining whether the network coding is to be performed by the first network node or the second network node is based at least in part on whether the first network node is a closest network node, of the first network node and the second network node, to the UE.

In a fourth aspect, alone or in combination with one or more of the first through third aspects, process 900 includes determining whether the network coding is to be performed by the first network node or the second network node based at least in part on a boundary associated with the first network node.

In a fifth aspect, alone or in combination with one or more of the first through fourth aspects, process 900 includes transmitting, to the second network node, an indication that the first network node will not transmit communications received from the UE if the UE is within an area.

In a sixth aspect, alone or in combination with one or more of the first through fifth aspects, process 900 includes transmitting the indication that the first network node will not transmit the communications received from the UE that is within the area based at least in part on determining that there is a blockage between the first network node and the UE.

In a seventh aspect, alone or in combination with one or more of the first through sixth aspects, the indication that the first network node will not transmit the communications received from the UE that is within the area comprises one or more of a location-based average reference signal received power, an identifier associated with the area, or a global navigation satellite system identification associated with the area.

In an eighth aspect, alone or in combination with one or more of the first through seventh aspects, the indication that the first network node will not transmit the communications received from the UE that is within the area includes a bit, wherein a first state of the bit indicates that the first network node will selectively transmit communications received from the UE that is within the area and a second state of the bit indicates that the first network node will not transmit communications received from the UE that is within the area.

In a ninth aspect, alone or in combination with one or more of the first through eighth aspects, process 900 includes transmitting, to the second network node, an indication that the first network node will not transmit any communications using network coding due to an overload state of the first network node.

In a tenth aspect, alone or in combination with one or more of the first through ninth aspects, the indication that the first network node will not transmit any communications using network coding comprises at least one of a start time at which the first network node will not transmit any communications using network coding or an end time at which the first network node will resume transmitting communications using network coding.

In an eleventh aspect, alone or in combination with one or more of the first through tenth aspects, the indication that the first network node will not transmit any communications using network coding includes a bit, wherein a first state of the bit indicates that the first network node is in an overload state and a second state of the bit indicates that the first network node is not in an overload state.

In a twelfth aspect, alone or in combination with one or more of the first through eleventh aspects, the bit indicates that the first network node has resumed transmitting communications.

In a thirteenth aspect, alone or in combination with one or more of the first through twelfth aspects, process 900 includes transmitting, to the second network node, an indication that the first network node has determined to transmit the communication using network coding.

In a fourteenth aspect, alone or in combination with one or more of the first through thirteenth aspects, the indication that the first network node has determined to transmit the communication using network coding comprises at least one of an identifier associated with the communication or an identifier associated with the UE.

In a fifteenth aspect, alone or in combination with one or more of the first through fourteenth aspects, process 900 includes monitoring for at least one of a feedback collection communication received from the second network node, a network coding communication received from the second network node, or an acknowledgement message transmitted from the UE to the second network node.

In a sixteenth aspect, alone or in combination with one or more of the first through fifteenth aspects, process 900 includes determining whether the network coding is to be performed by the first network node or the second network node based at least in part on the monitoring.

In a seventeenth aspect, alone or in combination with one or more of the first through sixteenth aspects, the first network node communicates with the second network node using one or more of sidelink control information, a medium access control message, or a radio resource control message.

In an eighteenth aspect, alone or in combination with one or more of the first through seventeenth aspects, process 900 includes transmitting, to the second network node, global navigation satellite system location information associated with the first network node.

In a nineteenth aspect, alone or in combination with one or more of the first through eighteenth aspects, process 900 includes receiving, from the second network node, global navigation satellite system location information associated with the second network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
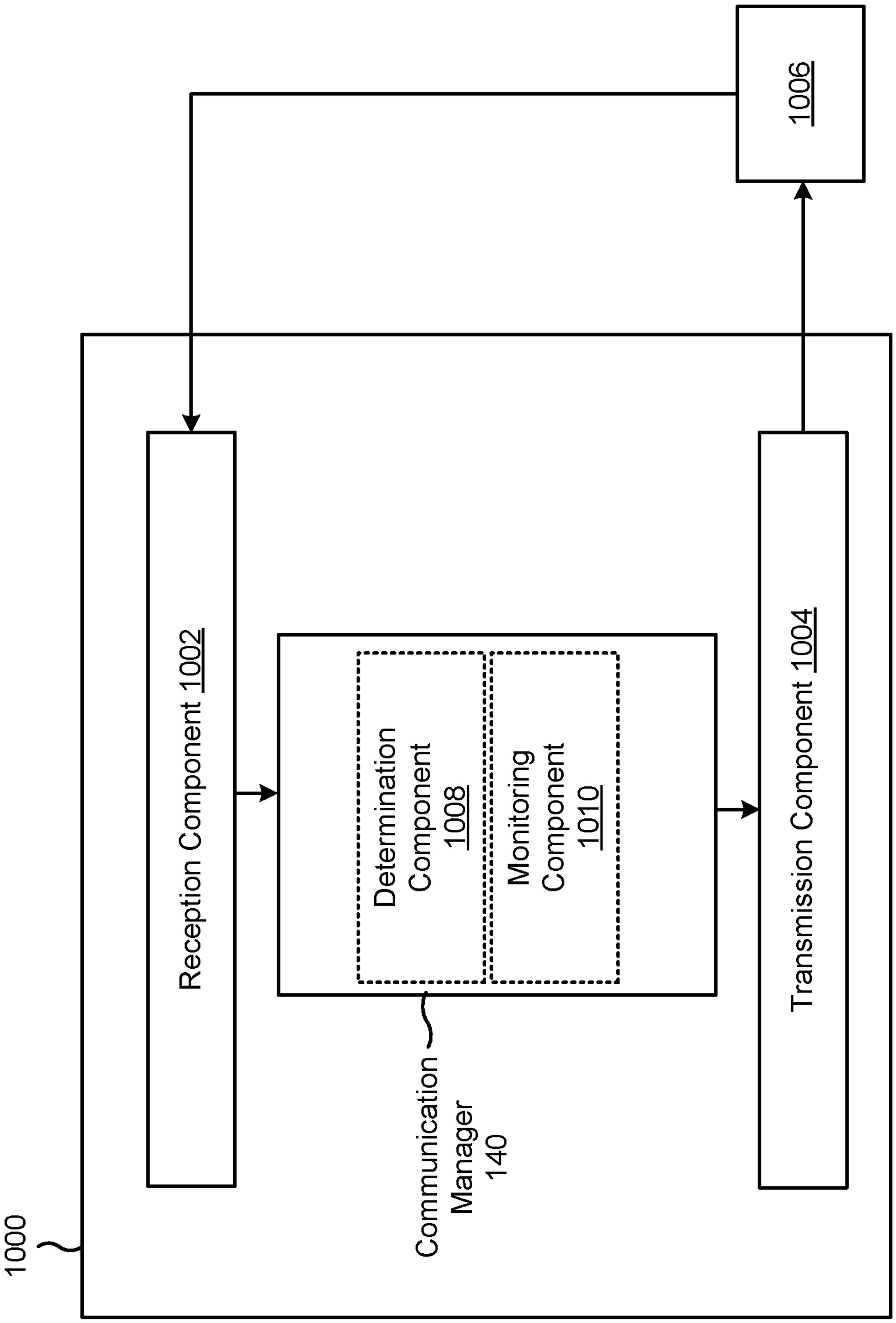
FIG. 10 is a diagram of an example apparatus for wireless communication, in accordance with the present disclosure.

FIG. 10 is a diagram of an example apparatus 1000 for wireless communication. The apparatus 1000 may be a first network node, or a first network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may be the communication manager 140 described above. The communication manager 140 may include one or more of a determination component 1008 or a monitoring component 1010, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the first network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first network node described in connection with FIG. 2. In some aspects, the transmission component 1004 may be co-located with the reception component 1002 in a transceiver.

The reception component 1002 may receive, from a UE, an indication to perform network coding for a communication. The transmission component 1004 may selectively transmit, based at least in part on determining whether the network coding is to be performed by the first network node or a second network node, the communication using network coding.

The determination component 1008 may determine whether the network coding is to be performed by the first network node or the second network node based at least in part on a location of the first network node, a location of the second network node, and a location of the UE.

The determination component 1008 may determine whether the network coding is to be performed by the first network node or the second network node based at least in part on a boundary associated with the first network node.

The transmission component 1004 may transmit, to the second network node, an indication that the first network node will not transmit communications received from the UE if the UE is within an area.

The transmission component 1004 may transmit the indication that the first network node will not transmit the communications received from the UE that is within the area based at least in part on determining that there is a blockage between the first network node and the UE.

The transmission component 1004 may transmit, to the second network node, an indication that the first network node will not transmit any communications using network coding due to an overload state of the first network node.

The transmission component 1004 may transmit, to the second network node, an indication that the first network node has determined to transmit the communication using network coding.

The monitoring component 1010 may monitor for at least one of a feedback collection communication received from the second network node, a network coding communication received from the second network node, or an acknowledgement message transmitted from the UE to the second network node.

The determination component 1008 may determine whether the network coding is to be performed by the first network node or the second network node based at least in part on the monitoring.

The transmission component 1004 may transmit, to the second network node, global navigation satellite system location information associated with the first network node.

The reception component 1002 may receive, from the second network node, global navigation satellite system location information associated with the second network node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first network node, comprising: receiving, from a user equipment (UE), an indication to perform network coding for a communication; and selectively transmitting, based at least in part on determining whether the network coding is to be performed by the first network node or a second network node, and based at least in part on at least one of a location of the first network node, a location of the second network node, or a location of the UE, the communication using network coding.

Aspect 2: The method of Aspect 1, wherein selectively transmitting the communication using network coding comprises refraining from transmitting the communication based at least in part on determining that the network coding is to be performed by the second network node.

Aspect 3: The method of any of Aspects 1-2, further comprising determining whether the network coding is to be performed by the first network node or the second network node based at least in part on a location of the first network node, a location of the second network node, and a location of the UE.

Aspect 4: The method of Aspect 3, wherein determining whether the network coding is to be performed by the first network node or the second network node is based at least in part on whether the first network node is a closest network node, of the first network node and the second network node, to the UE.

Aspect 5: The method of any of Aspects 1-4, further comprising determining whether the network coding is to be performed by the first network node or the second network node based at least in part on a boundary associated with the first network node.

Aspect 6: The method of any of Aspects 1-5, further comprising transmitting, to the second network node, an indication that the first network node will not transmit communications received from the UE if the UE is within an area.

Aspect 7: The method of Aspect 6, further comprising transmitting the indication that the first network node will not transmit the communications received from the UE that is within the area based at least in part on determining that there is a blockage between the first network node and the UE.

Aspect 8: The method of Aspect 6, wherein the indication that the first network node will not transmit the communications received from the UE that is within the area comprises one or more of a location-based average reference signal received power, an identifier associated with the area, or a global navigation satellite system identification associated with the area.

Aspect 9: The method of Aspect 6, wherein the indication that the first network node will not transmit the communications received from the UE that is within the area includes a bit, wherein a first state of the bit indicates that the first network node will selectively transmit communications received from the UE that is within the area and a second state of the bit indicates that the first network node will not transmit communications received from the UE that is within the area.

Aspect 10: The method of any of Aspects 1-5, further comprising transmitting, to the second network node, an indication that the first network node will not transmit any communications using network coding due to an overload state of the first network node.

Aspect 11: The method of Aspect 10, wherein the indication that the first network node will not transmit any communications using network coding comprises at least one of a start time at which the first network node will not transmit any communications using network coding or an end time at which the first network node will resume transmitting communications using network coding.

Aspect 12: The method of Aspect 10, wherein the indication that the first network node will not transmit any communications using network coding includes a bit, wherein a first state of the bit indicates that the first network node is in an overload state and a second state of the bit indicates that the first network node is not in an overload state.

Aspect 13: The method of Aspect 12, wherein the bit indicates that the first network node has resumed transmitting communications.

Aspect 14: The method of any of Aspects 1-9, further comprising transmitting, to the second network node, an indication that the first network node has determined to transmit the communication using network coding.

Aspect 15: The method of Aspect 14, wherein the indication that the first network node has determined to transmit the communication using network coding comprises at least one of an identifier associated with the communication or an identifier associated with the UE.

Aspect 16: The method of any of Aspects 1-15, further comprising monitoring for at least one of a feedback collection communication received from the second network node, a network coding communication received from the second network node, or an acknowledgement message transmitted from the UE to the second network node.

Aspect 17: The method of Aspect 16, further comprising determining whether the network coding is to be performed by the first network node or the second network node based at least in part on the monitoring.

Aspect 18: The method of any of Aspects 1-17, wherein the first network node communicates with the second network node using one or more of sidelink control information, a medium access control message, or a radio resource control message.

Aspect 19: The method of any of Aspects 1-18, further comprising transmitting, to the second network node, global navigation satellite system location information associated with the first network node.

Aspect 20: The method of any of Aspects 1-19, further comprising receiving, from the second network node, global navigation satellite system location information associated with the second network node.

Aspect 21: The method of any of Aspects 1-20, further comprising receiving, from the second network node, an indication that the second network node will not perform network coding, and transmitting, to the second network node, based at least in part on the indication that the second network node will not perform network coding, an indication that the first network node will perform network coding.

Aspect 22: The method of any of Aspects 1-21, wherein the second network node is one of a plurality of network nodes, wherein determining whether the network coding is to be performed by the first network node or the second network node comprises determining whether the network coding is to be performed by the first network node or a network node of the plurality of network nodes.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network node, comprising:

a memory; and one or more processors, coupled to the memory, configured to:

receive, from a user equipment (UE), an indication to perform network coding to combine a retransmission of a first sidelink communication and a second sidelink communication into a single network-coded communication, wherein the network coding is used to encode a set of original data, including the first sidelink communication and the second sidelink communication, into a set of encoded data that includes the single network-coded communication, wherein the single network-coded communication is a combined communication that includes both the first sidelink communication and the second sidelink communication, wherein the single network-coded communication includes a function of the first sidelink communication and the second sidelink communication using an exclusive or (XOR) operation, and wherein the network coding is associated with a linear system, for encoding communications, that includes variables, corresponding to the set of original data, and linearly independent constraints corresponding to the set of encoded data;

determine whether combining the retransmission of the first sidelink communication and the second sidelink communication into the single network-coded communication is to be performed by the first network node or a second network node, wherein whether the combining of the retransmission of the first sidelink communication and the second sidelink communication is to be performed by the first network node or the second network node is based at least in part on at least one of a location of the first network node, a location of the second network node, or a location of the UE; and selectively transmit, from the first network node to one or more other UEs and based at least in part on the determining, the single network-coded communication using the network coding.

2. The apparatus of claim 1, wherein the one or more processors, to selectively transmit the single network-coded communication using the network coding, are configured to refrain from transmitting the single network-coded communication based at least in part on determining that the combining of the retransmission of the first sidelink communication and the second sidelink communication is to be performed by the second network node.

3. The apparatus of claim 1, wherein determining whether the combining of the retransmission of the first sidelink communication and the second sidelink communication is to be performed by the first network node or the second network node is based at least in part on whether the first network node is a closest network node, of the first network node and the second network node, to the UE.

4. The apparatus of claim 1, wherein determining whether the combining of the retransmission of the first sidelink communication and the second sidelink communication is to be performed by the first network node or the second network node is based at least in part on a boundary associated with the first network node.

5. The apparatus of claim 1, wherein the one or more processors are further configured to transmit, to the second network node, an indication that the first network node will not transmit communications received from the UE if the UE is within an area relative to or associated with the first network node.

6. The apparatus of claim 5, wherein the one or more processors are further configured to transmit the indication that the first network node will not transmit the communications received from the UE that is within the area based at least in part on determining that there is a blockage between the first network node and the UE.

7. The apparatus of claim 5, wherein the indication that the first network node will not transmit the communications received from the UE that is within the area comprises one or more of a location-based average reference signal received power, an identifier associated with the area, or a global navigation satellite system identification associated with the area.

8. The apparatus of claim 5, wherein the indication that the first network node will not transmit the communications received from the UE that is within the area includes a bit, wherein a first state of the bit indicates that the first network node will selectively transmit communications received from the UE that is within the area and a second state of the bit indicates that the first network node will not transmit communications received from the UE that is within the area.

9. The apparatus of claim 1, wherein the one or more processors are further configured to transmit, to the second network node, an indication that the first network node will not transmit any communications using network coding due to an overload state of the first network node.

10. The apparatus of claim 9, wherein the indication that the first network node will not transmit any communications using network coding comprises at least one of a start time at which the first network node will not transmit any communications using network coding or an end time at which the first network node will resume transmitting communications using network coding.

11. The apparatus of claim 9, wherein the indication that the first network node will not transmit any communications using network coding includes a bit, wherein a first state of the bit indicates that the first network node is in an overload state and a second state of the bit indicates that the first network node is not in the overload state.

12. The apparatus of claim 1, wherein the one or more processors are further configured to transmit, to the second network node, an indication that the first network node has determined to transmit the single network-coded communication using the network coding.

13. The apparatus of claim 12, wherein the indication that the first network node has determined to transmit the single network-coded communication using the network coding comprises at least one of an identifier associated with the single network-coded communication or an identifier associated with the UE.

14. The apparatus of claim 1, wherein the one or more processors are further configured to monitor for at least one of a feedback collection communication received from the second network node, a network coding communication received from the second network node, or an acknowledgement message transmitted from the UE to the second network node.

15. The apparatus of claim 14, wherein the one or more processors are further configured to determine whether the combining of the retransmission of the first sidelink communication and the second sidelink communication is to be performed by the first network node or the second network node based at least in part on the monitoring.

16. The apparatus of claim 1, wherein the one or more processors are further configured to receive, from the second network node, an indication that the second network node will not perform network coding, and transmit, to the second network node, based at least in part on the indication that the second network node will not perform network coding, an indication that the first network node will perform network coding.

17. The apparatus of claim 1, wherein determining whether the combining of the retransmission of the first sidelink communication and the second sidelink communication is to be performed by the first network node or the second network node comprises determining whether the combining of the retransmission of the first sidelink communication and the second sidelink communication is to be performed by the first network node or a network node of a plurality of network nodes including the second network node.

18. A method of wireless communication performed by a first network node, comprising:

receiving, from a user equipment (UE), an indication to perform network coding to combine a retransmission of a first sidelink communication and a second sidelink communication into a single network-coded communication, wherein the network coding is used to encode a set of original data, including the first sidelink communication and the second sidelink communication, into a set of encoded data that includes the single network-coded communication, wherein the single network-coded communication is a combined communication that includes both the first sidelink communication and the second sidelink communication, wherein the single network-coded communication includes a function of the first sidelink communication and the second sidelink communication using an exclusive or (XOR) operation, and wherein the network coding is associated with a linear system, for encoding communications, that includes variables, corresponding to the set of original data, and linearly independent constraints corresponding to the set of encoded data;

determining whether combining the retransmission of the first sidelink communication and the second sidelink communication into the single network-coded communication is to be performed by the first network node or a second network node, wherein whether the combining of the retransmission of the first sidelink communication and the second sidelink communication is to be performed by the first network node or the second network node is based at least in part on at least one of a location of the first network node, a location of the second network node, or a location of the UE; and selectively transmitting, from the first network node to one or more other UEs and based at least in part on the determining, the single network-coded communication using the network coding.

19. The method of claim 18, wherein selectively transmitting the single network-coded communication using the network coding comprises refraining from transmitting the single network-coded communication based at least in part on determining that the combining of the retransmission of the first sidelink communication and the second sidelink communication is to be performed by the second network node.

20. The method of claim 18, wherein determining whether the combining of the retransmission of the first sidelink communication and the second sidelink communication is to be performed by the first network node or the second network node is based at least in part on whether the first network node is a closest network node, of the first network node and the second network node, to the UE.

21. The method of claim 18, wherein determining whether the combining of the retransmission of the first sidelink communication and the second sidelink communication is to be performed by the first network node or the second network node is based at least in part on a boundary associated with the first network node.

22. The method of claim 18, further comprising transmitting, to the second network node, an indication that the first network node will not transmit communications received from the UE if the UE is within an area relative to or associated with the first network node.

23. The method of claim 18, further comprising transmitting, to the second network node, an indication that the first network node will not transmit any communications using network coding due to an overload state of the first network node.

24. The method of claim 18, further comprising transmitting, to the second network node, an indication that the first network node has determined to transmit the single network-coded communication using the network coding.

25. A non-transitory computer-readable medium storing a set of instructions for wireless communication, the set of instructions comprising:

one or more instructions that, when executed by one or more processors of a first network node, cause the first network node to:

receive, from a user equipment (UE), an indication to perform network coding to combine a retransmission of a first sidelink communication and a second sidelink communication into a single network-coded communication, wherein the network coding is used to encode a set of original data, including the first sidelink communication and the second sidelink communication, into a set of encoded data that includes the single network-coded communication, wherein the single network-coded communication is a combined communication that includes both the first sidelink communication and the second sidelink communication, wherein the single network-coded communication includes a function of the first sidelink communication and the second sidelink communication using an exclusive or (XOR) operation, and wherein the network coding is associated with a linear system, for encoding communications, that includes variables, corresponding to the set of original data, and linearly independent constraints corresponding to the set of encoded data;

determine whether combining the retransmission of the first sidelink communication and the second sidelink communication into the single network-coded communication is to be performed by the first network node or a second network node, wherein whether the combining of the retransmission of the first sidelink communication and the second sidelink communication is to be performed by the first network node or the second network node is based at least in part on at least one of a location of the first network node, a location of the second network node, or a location of the UE; and selectively transmit, from the first network node to one or more other UEs and based at least in part on the determining, the single network-coded communication using the network coding.

26. The non-transitory computer-readable medium of claim 25, wherein determining whether the combining of the retransmission of the first sidelink communication and the second sidelink communication is to be performed by the first network node or the second network node is based at least in part on whether the first network node is a closest network node, of the first network node and the second network node, to the UE.

27. The non-transitory computer-readable medium of claim 25, wherein determining whether the combining of the retransmission of the first sidelink communication and the second sidelink communication is to be performed by the first network node or the second network node is based at least in part on a boundary associated with the first network node.

28. An apparatus for wireless communication, comprising:

means for receiving, from a user equipment (UE), an indication to perform network coding to combine a retransmission of a first sidelink communication and a second sidelink communication into a single network-coded communication, wherein the network coding is used to encode a set of original data, including the first sidelink communication and the second sidelink communication, into a set of encoded data that includes the single network-coded communication, wherein the single network-coded communication is a combined communication that includes both the first sidelink communication and the second sidelink communication, wherein the single network-coded communication includes a function of the first sidelink communication and the second sidelink communication using an exclusive or (XOR) operation, and wherein the network coding is associated with a linear system, for encoding communications, that includes variables, corresponding to the set of original data, and linearly independent constraints corresponding to the set of encoded data;

means for determining whether combining the retransmission of the first sidelink communication and the second sidelink communication into the single network-coded communication is to be performed by the apparatus or a second apparatus, wherein whether the combining of the retransmission of the first sidelink communication and the second sidelink communication is to be performed by the apparatus or the second apparatus is based at least in part on at least one of a location of the apparatus, a location of the second apparatus, or a location of the UE; and means for selectively transmitting, from the apparatus to one or more other UEs and based at least in part on the determining, the single network-coded communication using the network coding.

29. The apparatus of claim 28, wherein determining whether the combining of the retransmission of the first sidelink communication and the second sidelink communication is to be performed by the apparatus or the second apparatus is based at least in part on whether the apparatus is a closest apparatus, of the apparatus and the second apparatus, to the UE.

30. The apparatus of claim 28, wherein determining whether the combining of the retransmission of the first sidelink communication and the second sidelink communication is to be performed by the apparatus or the second apparatus is based at least in part on a boundary associated with the apparatus.

* * * * *